(12) United States Patent
Chardon et al.

(10) Patent No.: US 10,165,079 B2
(45) Date of Patent: Dec. 25, 2018

(54) PROVIDING A PERSONA-BASED APPLICATION EXPERIENCE

(71) Applicant: Microsoft Technology Licensing, LLC, Redmond, WA (US)

(72) Inventors: Alvin Chardon, Worcester, MA (US); Kristofer Hellick Reierson, Acton, MA (US); Angela Mele Anderson, Boston, MA (US); Galen Clyde Hunt, Bellevue, WA (US); Douglas Christopher Burger, Redmond, WA (US); Dilip Krishna Pai, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 413 days.

(21) Appl. No.: 14/831,347

(22) Filed: Aug. 20, 2015

(65) Prior Publication Data

US 2016/0134721 A1    May 12, 2016

Related U.S. Application Data

(63) Continuation of application No. 12/973,939, filed on Dec. 21, 2010, now Pat. No. 9,116,728.

(51) Int. Cl.
*G06F 9/455* (2018.01)
*H04L 29/08* (2006.01)
(Continued)

(52) U.S. Cl.
CPC ........ *H04L 67/306* (2013.01); *G06F 3/04842* (2013.01); *G06F 9/44505* (2013.01);
(Continued)

(58) Field of Classification Search
CPC ... H04L 67/306; H04L 67/18; G06F 3/04842; G06F 9/45558; G06F 9/44505; G06F 9/45504
See application file for complete search history.

(56) References Cited

U.S. PATENT DOCUMENTS 6,512,525 B1 * 1/2003 Capps ................ G06F 9/44505
                                                715/762
6,763,370 B1    7/2004 Schmeidler et al.
(Continued)

FOREIGN PATENT DOCUMENTS

CN    1744100        3/2006
CN    101194464      6/2008
(Continued)

OTHER PUBLICATIONS

"Application Virtualization with Citrix XenApp and HP Platforms", Retrieved at <<http://www.hp.com/hpinfo/newsroom/press_kits/2009/virtualization09/HP-CitrixXenAppsSolutionBrief.pdf>>, Nov. 2009, pp. 4.

(Continued)

*Primary Examiner* — Adam Lee
(74) *Attorney, Agent, or Firm* — David W. Foster; Newport IP, LLC

(57) ABSTRACT

Technologies are described herein for providing a persona-based application experience. In some configurations, an application can be adapted with a persona package selected from multiple persona packages. The persona packages may include persona-specific user settings, persona-specific application storage settings, or persona-specific application state settings. A persona package may be selected based on a current persona of a user, a time of day, and/or a location of the user. The selected persona package comprises a setting to adapt the execution of the application. In some configurations, a computer determines, a current persona of (Continued)

the user. The computer also receives a selected persona package comprising a user setting of the software application. The selection of the persona package is based on the current persona of the user and established credentials associated with the user. The computer adapts the execution of the software application according to the selected persona package.

49 Claims, 3 Drawing Sheets

(51) Int. Cl.
  *G06F 9/445* (2018.01)
  *G06F 3/0484* (2013.01)
(52) U.S. Cl.
  CPC ...... *G06F 9/45504* (2013.01); *G06F 9/45558* (2013.01); *H04L 67/18* (2013.01)

(56) References Cited

U.S. PATENT DOCUMENTS

| | | | |
|---|---|---|---|
| 6,938,096 | B1 | 8/2005 | Greschler et al. |
| 7,017,188 | B1 | 3/2006 | Schmeidler et al. |
| 7,028,305 | B2 | 4/2006 | Schaefer |
| 7,200,632 | B1 | 4/2007 | Greschler et al. |
| 7,225,264 | B2 | 5/2007 | Croman et al. |
| 7,426,661 | B2 | 9/2008 | Schaefer |
| 7,437,677 | B1 | 10/2008 | Capps et al. |
| 7,451,451 | B2 | 11/2008 | Schaefer |
| 7,523,070 | B2 | 4/2009 | McKegney et al. |
| 7,590,743 | B2 | 9/2009 | Willis |
| 7,690,039 | B2 | 3/2010 | Schmeidler et al. |
| 7,707,641 | B2 | 4/2010 | Schmeidler et al. |
| 7,730,169 | B1 | 6/2010 | Greschler et al. |
| 7,797,372 | B2 | 9/2010 | Greschler et al. |
| 7,933,632 | B2 | 4/2011 | Flynt et al. |
| 8,078,713 | B1 | 12/2011 | Kim |
| 8,359,016 | B2 | 1/2013 | Lindeman et al. |
| 8,489,872 | B1 | 7/2013 | Kapoor |
| 8,494,964 | B1 | 7/2013 | Sanderson |
| 2002/0073165 | A1* | 6/2002 | McNulty ........... G06F 17/30893 709/217 |
| 2002/0133500 | A1* | 9/2002 | Arlein ............... G06F 21/6254 |
| 2003/0131260 | A1* | 7/2003 | Hanson ............. H04L 63/0414 713/194 |
| 2004/0148346 | A1* | 7/2004 | Weaver .............. H04L 12/1822 709/204 |
| 2004/0179669 | A1 | 9/2004 | Gilbert et al. |
| 2005/0060532 | A1* | 3/2005 | Dorenbosch ...... H04M 1/72563 713/100 |
| 2005/0080862 | A1* | 4/2005 | Kent, Jr. ............. G06Q 10/107 709/206 |
| 2005/0091072 | A1* | 4/2005 | Dunn ................. G06Q 10/10 705/1.1 |
| 2005/0091272 | A1* | 4/2005 | Smith ................ G06Q 10/06 |
| 2005/0108329 | A1* | 5/2005 | Weaver .............. H04L 12/1822 709/204 |
| 2006/0036951 | A1* | 2/2006 | Marion .............. G06F 21/31 715/733 |
| 2007/0061730 | A1* | 3/2007 | O'Mahony ......... G06F 21/41 715/733 |
| 2007/0121869 | A1* | 5/2007 | Gorti ................. H04L 29/06027 379/201.02 |
| 2007/0124336 | A1 | 5/2007 | Arellano |
| 2007/0124541 | A1 | 5/2007 | Lang et al. |
| 2008/0027924 | A1* | 1/2008 | Hamilton .......... G06F 17/30867 |
| 2008/0071808 | A1* | 3/2008 | Hardt ................ G06F 17/243 |
| 2008/0097849 | A1* | 4/2008 | Ramsaier .......... G06Q 20/10 705/14.67 |
| 2008/0133716 | A1* | 6/2008 | Rao ................... G06Q 30/08 709/220 |
| 2008/0177708 | A1* | 7/2008 | Ayyar ............... G06F 17/30864 |
| 2008/0195711 | A1 | 8/2008 | Morton et al. |
| 2008/0215867 | A1 | 9/2008 | Mackin et al. |
| 2008/0306956 | A1 | 12/2008 | Werthessen et al. |
| 2009/0024992 | A1 | 1/2009 | Kulaga et al. |
| 2009/0070431 | A1 | 3/2009 | Malik et al. |
| 2009/0119588 | A1 | 5/2009 | Moore |
| 2009/0165089 | A1* | 6/2009 | Bennett ............. G06F 21/41 726/3 |
| 2009/0183182 | A1 | 7/2009 | Parthasarathy et al. |
| 2009/0195711 | A1 | 8/2009 | Sime |
| 2009/0199175 | A1 | 8/2009 | Keller et al. |
| 2009/0199178 | A1 | 8/2009 | Keller et al. |
| 2009/0249051 | A1 | 10/2009 | TeNgaio et al. |
| 2009/0254927 | A1 | 10/2009 | Shlomai et al. |
| 2009/0271787 | A1 | 10/2009 | Clark |
| 2009/0285393 | A1 | 11/2009 | Osthassel |
| 2009/0313274 | A1* | 12/2009 | Chen ................. G06F 17/274 |
| 2009/0327296 | A1* | 12/2009 | Francis ............. G06F 17/30 |
| 2010/0023495 | A1 | 1/2010 | Gupta et al. |
| 2010/0023738 | A1 | 1/2010 | Sheehan et al. |
| 2010/0024015 | A1* | 1/2010 | Hardt ................ H04L 67/14 726/6 |
| 2010/0037206 | A1 | 2/2010 | Larimore et al. |
| 2010/0064340 | A1 | 3/2010 | McCorkendale et al. |
| 2010/0187302 | A1* | 7/2010 | Sermersheim ...... G06F 21/33 235/380 |
| 2010/0210304 | A1* | 8/2010 | Huslak .............. G06Q 10/10 455/558 |
| 2010/0235830 | A1 | 9/2010 | Shukla et al. |
| 2010/0275130 | A1* | 10/2010 | McBride ............ G06Q 10/10 715/751 |
| 2010/0281427 | A1* | 11/2010 | Ghosh .............. G06F 21/6263 715/811 |
| 2010/0287605 | A1 | 11/2010 | Strandell |
| 2010/0306270 | A1 | 12/2010 | McDiarmid et al. |
| 2010/0318997 | A1 | 12/2010 | Li et al. |
| 2011/0053574 | A1* | 3/2011 | Rice ................. H04M 1/006 455/418 |
| 2011/0078794 | A1 | 3/2011 | Manni et al. |
| 2011/0106610 | A1* | 5/2011 | Landis .............. G06Q 30/02 705/14.39 |
| 2011/0134765 | A1 | 6/2011 | Rector et al. |
| 2011/0185043 | A1 | 7/2011 | Zeller et al. |
| 2011/0264657 | A1 | 10/2011 | Hoffman et al. |
| 2011/0295928 | A1* | 12/2011 | Siegel .............. H04L 63/10 709/203 |
| 2012/0033610 | A1* | 2/2012 | Ring ................ H04L 67/141 370/328 |
| 2012/0054853 | A1* | 3/2012 | Gupta .............. G06F 21/53 726/17 |
| 2012/0159479 | A1 | 6/2012 | Chardon et al. |
| 2013/0080927 | A1 | 3/2013 | Weaver et al. |

FOREIGN PATENT DOCUMENTS

| | | |
|---|---|---|
| JP | 2002288125 | 9/2002 |
| JP | 2003037667 | 2/2003 |
| JP | 2003080912 | 3/2003 |
| JP | 2003323363 | 9/2003 |
| JP | 2003-337704 A | 11/2003 |
| JP | 2004503875 A | 2/2004 |
| JP | 2004246751 A | 9/2004 |
| JP | 2004287999 A | 10/2004 |
| JP | 2005160865 | 6/2005 |
| JP | 2005334372 | 11/2005 |
| JP | 2006017101 | 1/2006 |
| JP | 2006072440 A | 3/2006 |
| JP | 2006209774 A | 8/2006 |
| JP | 2006338225 A | 12/2006 |
| JP | 2008-204330 A | 9/2008 |
| JP | 2009032073 A | 2/2009 |
| JP | 2014501408 A | 1/2014 |
| TW | 200941347 | 10/2009 |
| TW | 201015439 A | 4/2010 |
| TW | 201039240 A | 11/2010 |
| WO | 2009045717 A1 | 4/2009 |

(56) References Cited

FOREIGN PATENT DOCUMENTS

| WO | WO2009101014 | 8/2009 |
|----|--------------|--------|
| WO | 2010014431 A2 | 2/2010 |
| WO | WO2010014104 | 2/2010 |

OTHER PUBLICATIONS

"Ceedo Virtualization Technology Overview", Retrieved at<< http://files.ceedo.com/resources/CeedoVirtualizationTechnologyOverview.pdf >>, Jan. 2010, pp. 17.
Chinese Official Action dated Mar. 5, 2014, in Chinese Application No. 201110431012.6.
Translated the Chinese Office Action dated Feb. 11, 2015 for Chinese patent application No. 201110431012.6, a counterpart foreign application of U.S. Appl. No. 12/973,939, 10 pages.
Translated the Chinese Office Action dated Oct. 20, 2014 for Chinese patent application No. 201110431012.6, a counterpart foreign application of U.S. Appl. No. 12/973,939, 9 pages.
Translated the Chinese Office Action dated Jul. 20, 2015 for Chinese patent application No. 201110431012.6, a counterpart foreign application of U.S. Appl. No. 12/973,939, 10 pages.
Extended European Search Report dated Aug. 4, 2014 for European Patent Application No. 11850928.0, 7 pages.
International Search Report dated Aug. 9, 2012, in International Application No. PCT/US11/065950.
Translated Japanese Office Action dated Dec. 8, 2015 for Japanese Application No. 2013-546297, a counterpart foreign application of U.S. Appl. No. 12/973,939, 6 pages.
Office action for U.S. Appl. No. 12/973,939, dated Oct. 9, 2013, Chardon, et al., "Providing a Persona-Based Application Experience", 19 pages.
Office action for U.S. Appl. No. 12/973,939, dated Dec. 7, 2012, Chardon, et al., "Providing a Persona-Based Application Experience", 20 pages.
Office action for U.S. Appl. No. 12/973,939, dated Feb. 27, 2014, Chardon, et al., "Providing a Persona-Based Application Experience", 21 pages.
Office action for U.S. Appl. No. 12/973,939, dated May 20, 2013, Chardon, et al., "Providing a Persona-Based Application Experience", 20 pages.
Office action for U.S. Appl. No. 12/973,939, dated Sep. 4, 2014, Chardon, et al., "Providing a Persona-Based Application Experience", 15 pages.
"VMware View-Point Blog", Retrieved at <<http://blogs.vmware.com/view-point/ >>,Aug. 31, 2010, pp. 19.
Ward, Keith, "The Next Frontier: Mobile Phone Hypervisors", Retrieved at <<http://virtualizationreview.com/articles/2009/01/01/the-next-frontier-mobile-phone-hypervisors.aspx >>,Jan. 1, 2009, pp. 3.
"Notice of Allowance Issued in Japanese Patent Application No. 2013-546297", dated Jul. 12, 2016, 3 Pages. (W/o English Translation).
"Final Office Action Received in Chinese Patent Application No. 201110431012.6", dated Jan. 18, 2016, 12 Pages.
"International Preliminary Report on Patentability Issued in PCT Patent Application No. PCT/US2011/065950", dated Jul. 4, 2013, 5 Pages.
European Office Action dated Apr. 4, 2016 for European patent application No. 11850928.0, a counterpart foreign application of U.S. Pat. No. 9,116,728, 3 pages.
Taiwanese Office Action dated Feb. 17, 2016 for Taiwanese Patent Application No. 100142580, a counterpart foreign application of U.S. Pat. No. 9,116,728, 14 pages.
JP2016156700—Office Action dated Jul. 11, 2017, 7 pages.
"Office Action and Search Report Issued in Taiwan Patent Application No. 105118423", dated Oct. 26, 2017, 17 Pages.

\* cited by examiner

PROVIDING A PERSONA-BASED APPLICATION EXPERIENCE

CROSS REFERENCE TO RELATED APPLICATIONS

This application is a continuation of co-pending of U.S. application Ser. No. 12/973,939 filed Dec. 21, 2010, entitled "Providing a Persona-based Application Experience," which is incorporated herein by reference in its entirety.

BACKGROUND

Some computing devices are mobile devices capable of being utilized for multiple purposes and at a variety of locations. For example, an employee may carry a laptop computer. The mobility and flexibility of the laptop computer may allow the employee to perform work-related functions and address personal computing needs at the office, at home, at a coffee shop, and other locations. However, the employee's occupation may require the employee to access business critical data through secure work networks. As a result, an employer may be concerned about the security of such business critical data and work networks.

Conventionally, the employer may assign a work laptop computer to the employee and limit access to the business critical data and the work networks through only the work laptop computer. The employer may also limit access to personal applications that are not related to work. As a result, the employee may be left to carry a separate laptop computer to address personal computing needs. Such a practice of carrying and maintaining multiple computing devices in order to satisfy multiple purposes can be significantly burdensome and costly, especially for users who have multiple devices (e.g., a laptop computer, a smartphone, a tablet computer, etc.).

It is with respect to these considerations and others that the disclosure made herein is presented.

SUMMARY

Technologies are described herein for providing a persona-based application experience. In some configurations, an application can be adapted with a persona package selected from multiple persona packages. The persona packages may include persona-specific user settings, persona-specific application storage settings, and/or persona-specific application state settings. A persona package may be selected based on a current persona of a user, a time of day, and/or a location of the user. The selected persona package comprises settings to adapt the execution of the application.

In some configurations, a computer having a memory and a processor is configured to determine, from a plurality of personas of a user, a current persona of the user. The computer also receives a selected persona package comprising a user setting of the software application. The selection of the persona package is based on the current persona of the user and established credentials associated with the user. The computer can adapt the execution of the software application according to the selected persona package.

In some configurations, a computer having a memory and a processor is configured to determine, from a plurality of personas of a user of the computer system, a current persona of the user. The current persona can include data defining multiple user settings. The computer can select a persona package comprising a user setting of an application. The persona package can be selected based on the determined current persona of the user and established credentials associated with the user. The computer can also adapt the execution of the application according to the persona package.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing a persona-based application experience. A virtualized application may include an application layer and a virtualization layer. The virtualization layer may provide an abstraction of the underlying execution environment. The virtualization layer may provide an isolated virtual environment in which the application layer operates. The virtual environment may include a virtual file system, a virtual registry, and/or the like.

Through the utilization of the technologies and concepts presented herein, the virtualization layer can be adapted to customize the virtualized application based on an appropriate persona package. When a user requests execution of the virtualized application, the virtualization layer may query a persona provider, which determines the user's current persona from multiple personas. The persona provider may then select a persona configuration corresponding to the present persona.

Upon selecting the persona configuration, the persona provider may retrieve a location of the appropriate persona package from the selected persona configuration. The persona provider may then provide the location of the appropriate persona package to the virtualization layer. The virtualization layer may access the persona package at the location and customize the virtualized application according to the persona package. In this way, the user can be provided with a persona-based application experience. The appropriate persona package may include persona-specific user settings, persona-specific application storage settings, and persona-specific application state settings.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
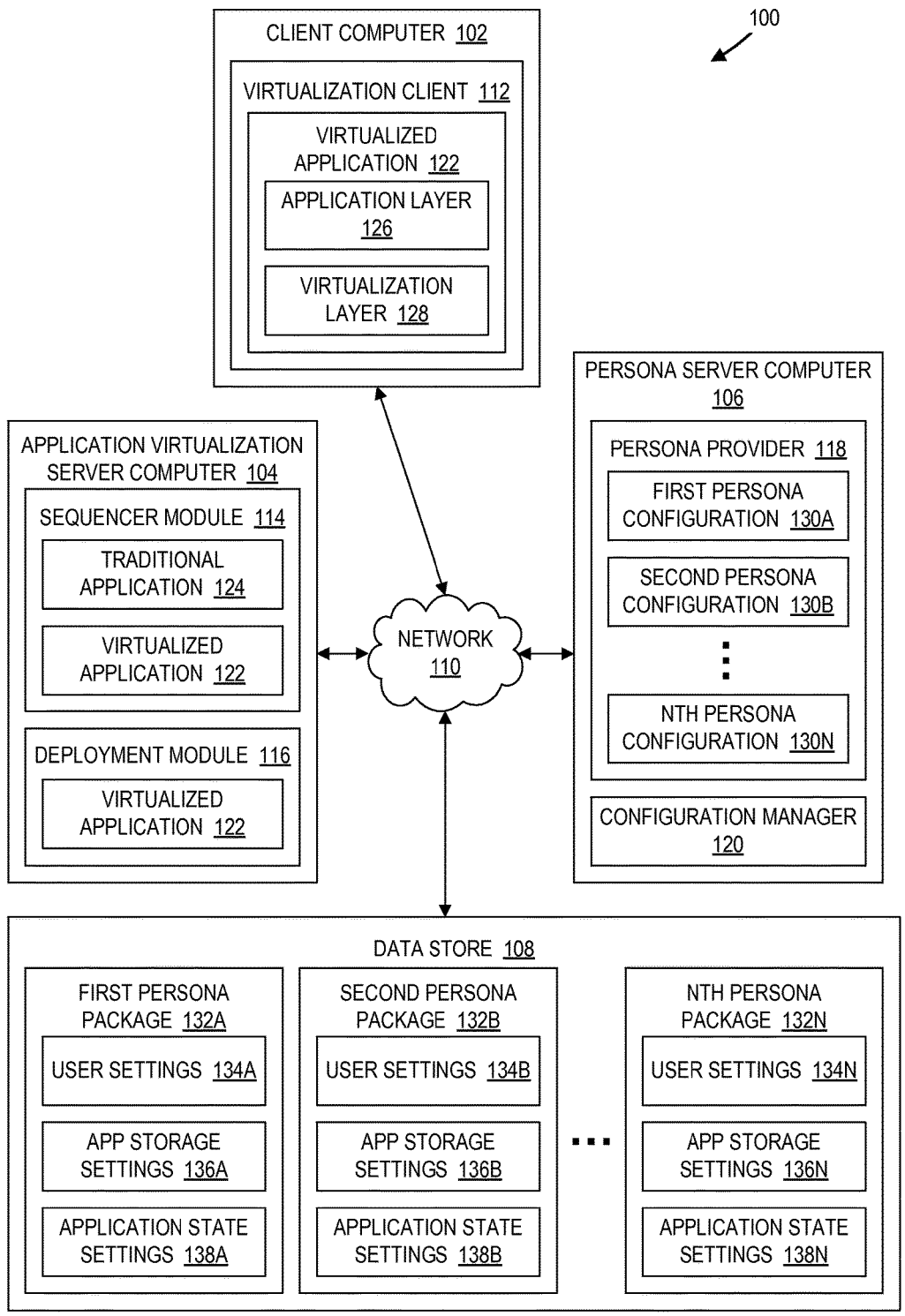
FIG. 1 is a block diagram illustrating a network architecture for providing a persona-based application experience, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, a computing system and methodology for providing a persona-based application experience will be described. In particular, FIG. 1 illustrates a network architecture 100 for providing a persona-based application experience, in accordance with some embodiments. The network architecture 100 may include a client computer 102, an application virtualization server computer 104, a persona server computer 106, and a data store 108. The client computer 102, the application virtualization server computer 104, the persona server computer 106, and the data store 108 may be coupled via a communications network 110. Some examples of the communications network 110 may include a local area network ("LAN"), a wide area network ("WAN"), and the Internet.

The client computer 102 may include a virtualization client 112. The application virtualization server computer 104 may include a sequencer module 114 and a deployment module 116. The persona server computer 106 may include a persona provider 118 and a configuration manager 120. In other embodiments, one or more components in the persona server computer 106 and/or the data store 108 may be contained locally within the client computer 102.

The client computer 102 may be configured to provide one or more virtualized applications, such as a virtualized application 122. Generally, application virtualization refers to various techniques that make traditionally installed applications available to a client computer without having to install the applications on the client computer. In application virtualization, virtualized applications may be streamed on-demand to the client computer. Each virtualized application may run in its own self-contained virtual environment on the client computer. That is, each virtualized application may be isolated from each other, as well as from the underlying operating system. As a result, application virtualization can reduce application conflicts, centralize and simplify application patching and update, and accelerate the deployment of new applications and updates.

In some illustrative implementations, the sequencer module 114 may virtualize a traditionally installed application (hereinafter "traditional application") 124 into the virtualized application 122. The sequencer module 114 may then provide the virtualized application 122 to the deployment module 116. The deployment module 116 may stream the virtualized application 122 to the client computer 102 on-demand. For example, a user may request execution of the virtualized application 122 by selecting an icon corresponding to the virtualized application 122 on a graphical user interface ("GUI") provided by the client computer 102. The virtualization client 112 may receive the virtualized application 122 for execution by the client computer 102. It should be appreciated that other suitable techniques for generating the virtualized application 122 and/or deploying the virtualized application 122 to the client computer 102 may be contemplated by one skilled in the art.

The virtualized application 122 may include an application layer 126 and a virtualization layer 128. The application layer 126 may contain program code and other suitable data capable of providing various application-related tasks of the virtualized application 122. The virtualization layer 128 may provide and manage the underlying virtual environment in which the client computer 102 executes the application layer 126. For example, the virtual environment may include a virtual file system, a virtual registry, and/or the like.

When establishing the virtual environment, the virtualization layer 128 may query the persona provider 118 for a location of an appropriate persona package associated with the user's current persona. Upon receiving the query, the persona provider 118 may determine the user's current persona and select a persona configuration that corresponds to the user's current persona. The persona provider 118 may include a first persona configuration 130A, a second persona configuration 130B, and an Nth persona configuration 130N. The persona configurations 130A-130N may be collectively referred to as persona configurations 130. In other embodiments, the persona configurations 130A-130N may be stored in a remote data store (not shown) and retrieved by the persona provider 118 over the network 110.

In various embodiments, the persona provider 118 may determine the user's current persona and select the corresponding persona configuration from the persona configurations 130 based on persona identifying information. The persona configurations 130 may be specified by the user, an administrator, and/or by some other personnel through the configuration manager 120. Access to the configuration manager 120 may also be restricted according to some embodiments. For example, the configuration manager 120 may restrict access to only select administrators, thereby allowing an enterprise to prevent employees from modifying the persona configurations 130. Some examples of the persona identifying information may include established credentials of the user, location of the user, time of day, the user's computer network, user gestures, and/or user preference or configuration.

The established credentials may include some form of identification that identifies the user. In this case, the persona provider 118 may select the persona configuration that corresponds to the identified user. The identity of the user may be submitted by the user (e.g., through a username and password) or determined by other suitable means (e.g., a Media Access Control ("MAC") address associated with the client computer 102). In this case, the persona provider 118 may select the persona configuration that corresponds to the identity of the user. The location of the user may refer to the location of the user when the user requests execution of the virtualized application 122. The location of the user may be determined based on Internet Protocol ("IP") address, Global Position System ("GPS") coordinates, or other suitable location determination techniques. In this case, the persona provider 118 may select the persona configuration that corresponds to the location of the user.

The time of day may refer the current time when the user requests execution of the virtualized application 122. In this case, the persona provider 118 may select the persona configuration that corresponds to the time of day. The computer network may refer to the current computer network to which the client computer 102 is connected. The computer network may be determined by the IP address or other suitable network-related information associated with the client computer 102. For example, by identifying the computer network, the persona provider 118 may determine whether the user is at home, work, or some other location. In this case, the persona provider 118 may select the persona configuration that corresponds to the user's computer network.

The user gestures may refer particular user actions. In this case, the persona provider 118 may select or infer the persona configuration based on the user's particular actions. For example, if the user opens a particular document, the persona provider 118 may infer a persona configuration that corresponds to type and/or content of the document. The user preference or configuration may refer to user-defined preferences and/or configurations with respect to the selection of the persona configuration. In this case, the persona provider 118 may select the persona configuration based on the user preference or configuration. For example, the user may associate each persona configuration to various criteria, including those previously described such as location of the user, time of day, the user's computer network, user gestures, and/or the like. Such user preferences may operate separate from or in conjunction with the administrator's configuration.

Each of the persona configurations 130 may contain a location of a corresponding persona package in the data store 108. The data store 108 may be a database or other suitable data storage mechanism. The data store 108 may include a first persona package 132A, a second persona package 132B, and an Nth persona package 132N. For example, the first persona package 132A may correspond to the first persona configuration 130A. The second persona package 132B may correspond to the second persona configuration 130B. The Nth persona package 132N may correspond to the Nth persona configuration 130N. The persona packages 132A-132N may be collectively referred to as persona packages 132. When the persona provider 118 determines the user's current persona and selects the persona configuration based on persona identifying information, the persona provider 118 may retrieve the location of the corresponding persona package from the selected persona configuration. The persona provider 118 may then provide the location of the persona package to the virtualization layer 128 in response to the query.

Upon receiving the location of the persona package, the virtualization layer 128 may access the persona package at the location from the data store 108. The virtualization layer 128 may then adapt execution of the virtualized application 122 according to the persona package, thereby providing a persona-based application experience to the user. In particular, the virtualization layer 128 may access user settings, application storage, and application state contained in the persona package. For example, the first persona package 132A may include associated user settings 134A, application storage settings 136A, and application state settings 138A that are specific to the first persona package 132A. The second persona package 132B may include associated user settings 134B, application storage settings 136B, and application state settings 138B that are specific to the second persona package 132B. The Nth persona package 132N may include associated user settings 134N, application storage settings 136N, and application state settings 138N that are specific to the Nth persona package 132N. The user settings 134A-134N may be collectively referred to as user settings 134. The application storage settings 136A-136N may be collectively referred to as application storage settings 136. The application state settings 138A-138N may be collectively referred to as application state settings 138.

The user settings 134 may define user-specified settings of the virtualized application 122. In one example, the user may customize the GUI of the virtualized application 122 by selecting a certain theme, certain icons, and certain toolbars. In another example, the user may customize the security settings of the virtualized application 122. The application storage settings 136 may define a location of local and/or remote application storage from where application data can be retrieved and to where application data can be stored. For example, if the virtualized application 122 is a word processing application, the application storage may store documents created through the virtualized application 122. The application state settings 138 may define the most recent state of the virtualized application 122 before the virtualized application 122 was closed. For example, if the virtualized application 122 is a word processing application, the application state may include a list of recent documents accessed by the virtualized application 122 and list of recent symbols inserted into in the documents.

Figure 2:
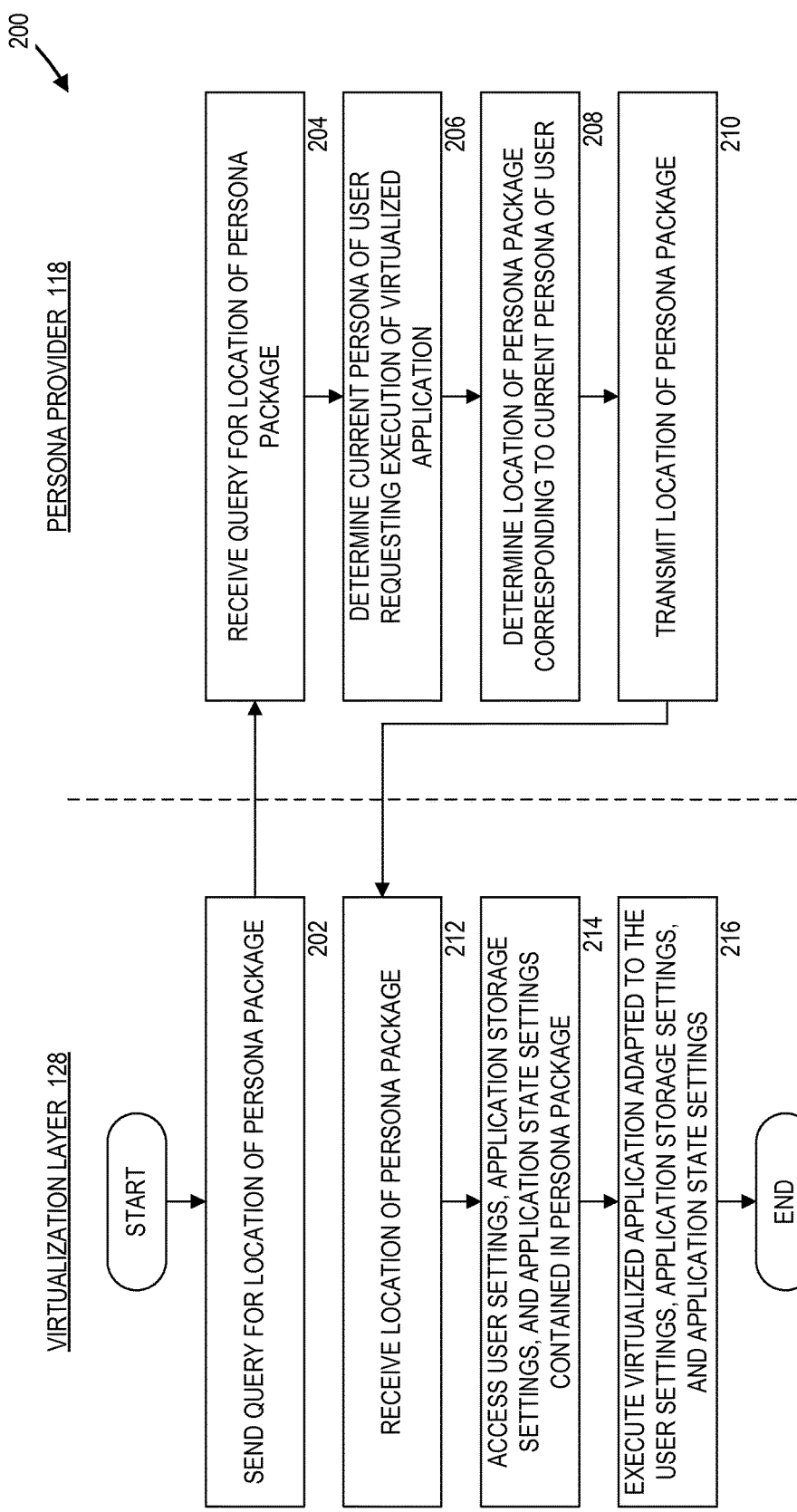
FIG. 2 is a flow diagram illustrating a method for providing a persona-based application experience, in accordance with some embodiments.

Referring now to FIG. 2, additional details regarding the operation of the virtualization client 112 and the persona provider 118. In particular, FIG. 2 is a flow diagram illustrating a method for providing a persona-based application experience, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 2, a routine 200 begins at operation 202, where the virtualization layer 128 sends a query for an appropriate persona package to the persona provider 118. The virtualization layer 128 may send the query when a user requests execution of the virtualized application 122. The routine 200 then proceeds to operation 204, where the persona provider 118 receives the query for the appropriate persona package from the virtualization layer 128. When the persona provider 118 receives the query for the appropriate persona package from the virtualization layer 128, the routine 200 proceeds to operation 206.

At operation 206, the persona provider 118 determines a current persona of the user requesting execution of the virtualized application 122. The persona provider 118 may determine the current persona of the user based on suitable persona identifying information. Some examples of persona identifying information may include may include established credentials of the user, location of the user, time of day, the user's computer network, user gestures, and/or user preferences or user configuration. When the persona provider determines the current persona of the user requesting execution of the virtualized application 122, the routine 200 proceeds to operation 208.

At operation 208, the persona provider 118 determines the location of the appropriate persona package. The persona provider 118 may identify a persona configuration from the multiple persona configurations 130 corresponding to the user's current persona. In an illustrative example, the persona provider 118 may identify that the first persona configuration 130A corresponds to the user's current persona. The persona provider 118 may then retrieve the location of the first persona package 132A which is contained in the first persona configuration 130A. When the persona provider 118 determines the location of the appropriate persona package, the routine 200 proceeds to operation 210.

At operation 210, the persona provider 118 transmits the location of the appropriate persona package to the virtualization layer 128 in response to the query. In the illustrative example, the persona provider 118 may transmit the location of the first persona package 132A to the virtualization layer 128. The routine 200 then proceeds to operation 212, where the virtualization layer 128 receives the location of the appropriate persona package. When the virtualization layer 128 receives the location of the appropriate persona package, the routine 200 proceeds to operation 214.

At operation 214, the virtualization layer 128 accesses the persona package at the location in the data store 108. In particular, the virtualization layer 128 may access user settings, application storage settings, and application state settings contained in the appropriate persona package. In the illustrative example, the virtualization layer 128 may access the user settings 134A, the application storage settings 136A, and the application state settings 138A contained in the first persona package 132A. When the virtualization layer 128 accesses the persona package at the location in the data store 108, the routine 200 proceeds to operation 216.

At operation 216, the virtualization layer 128 executes the virtualized application 122 adapted to the accessed user settings, application storage settings, and application state settings. In the illustrative example, the virtualization layer 128 may execute the virtualization application 122 adapted to the user settings 134A, the application storage settings 136A, and the application state settings 138A. In this way, execution of the virtualized application 122 can be customized according, to the user's current persona. When the virtualization layer 128 executes the virtualized application 122 adapted to the accessed user settings, application storage settings, and application state settings, the routine 200 may either repeat (e.g., periodically, continuously, or on demand as needed) or terminate.

Figure 3:
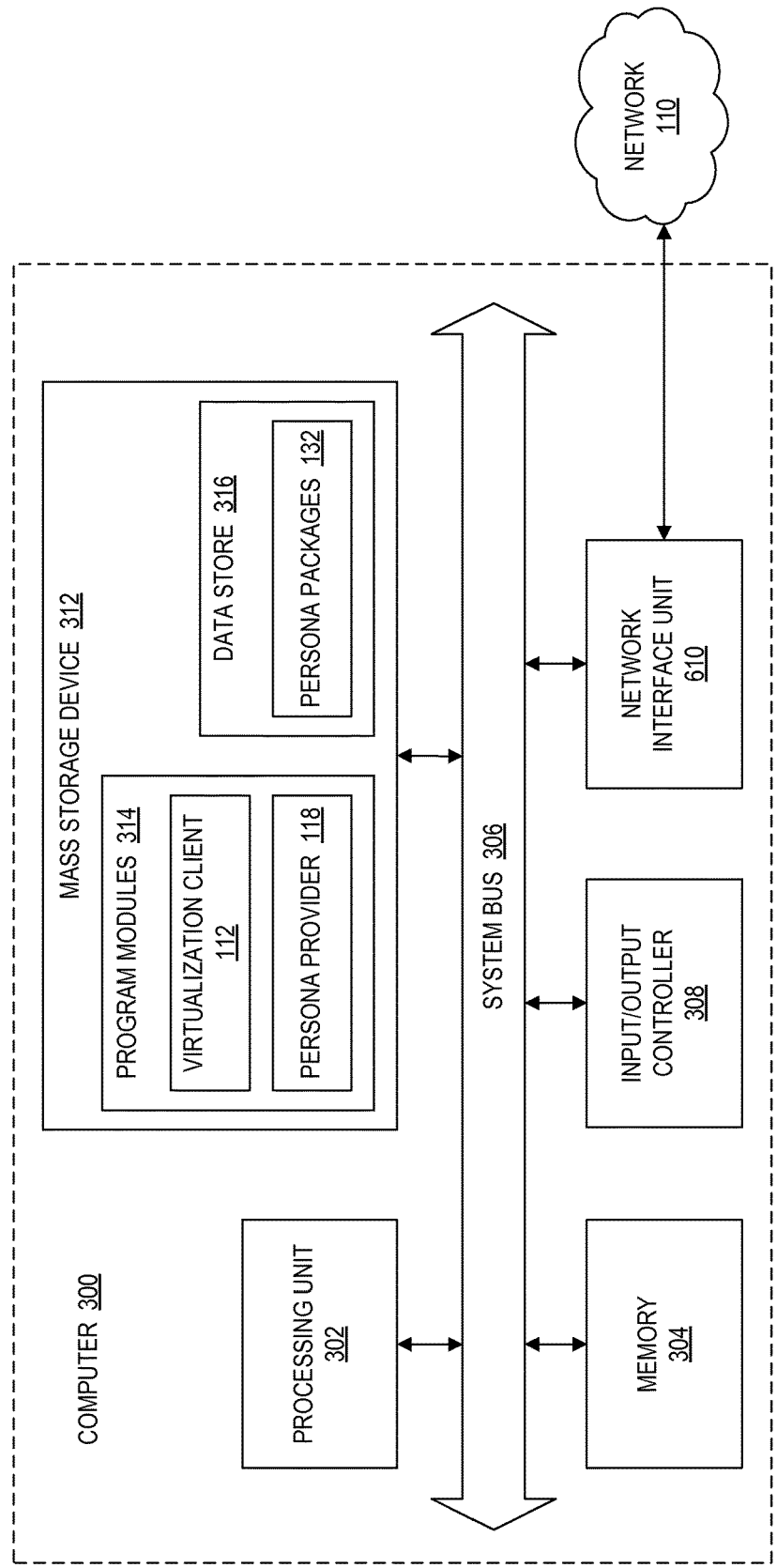
FIG. 3 is a computer architecture diagram showing an illustrative computer hardware architecture for a computing system capable of implementing the embodiments presented herein.

Turning now to FIG. 3, an example computer architecture diagram showing a computer 300 is illustrated. Examples of the computer 300 may include the client computer 102, the application virtualization server computer 104, and the persona server computer 106. The computer 300 may include a central processing unit 302, a system memory 304, and a system bus 306 that couples the memory 304 to the 302. The computer 300 may further include a mass storage device 312 for storing one or more program modules 314 and a data store 316. Examples of the program modules 314 may include the virtualization client 112, the sequencer module 114, the deployment module 116, the persona provider 118, and the configuration manager 120. An example of the data store 316 may include the data store 108. The mass storage device 312 may be connected to the processing unit 302 through a mass storage controller (not shown) connected to the bus 306. The mass storage device 312 and its associated computer-storage media may provide non-volatile storage for the computer 300. Although the description of computer-storage media contained herein refers to a mass storage device, such as a hard disk or CD-ROM drive, it should be appreciated by those skilled in the art that computer-storage media can be any available computer storage media that can be accessed by the computer 300.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 300.

According to various embodiments, the computer 300 may operate in a networked environment using logical connections to remote computers through a network, such as the network 110. The computer 300 may connect to the network 110 through a network interface unit 310 connected to the bus 306. It should be appreciated that the network interface unit 310 may also be utilized to connect to other types of networks and remote computer systems. The computer 300 may also include an input/output controller 308 for receiving and processing input from a number of input devices (not shown), including a keyboard, a mouse, a microphone, and a game controller. Similarly, the input/output controller 308 may provide output to a display or other type of output device (not shown).

The bus 306 may enable the processing unit 302 to read code and/or data to/from the mass storage device 312 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 314 may include software instructions that, when loaded into the processing unit 302 and executed, cause the computer 300 to provide a persona-based application experience. The program modules 314 may also provide various tools or techniques by which the computer 300 may participate within the overall systems or operating environments using the components, flows, and data structures discussed throughout this description. For example, the program modules 314 may implement interfaces for providing a persona-based application experience.

In general, the program modules 314 may, when loaded into the processing unit 302 and executed, transform the processing unit 302 and the overall computer 300 from a general-purpose computing system into a special-purpose computing system customized to provide a persona-based application experience. The processing unit 302 may be constructed from any number of transistors or other discrete circuit elements, which may individually or collectively assume any number of states. More specifically, the processing unit 302 may operate as a finite-state machine, in response to executable instructions contained within the program modules 314. These computer-executable instructions may transform the processing unit 302 by specifying how the processing unit 302 transitions between states, thereby transforming the transistors or other discrete hardware elements constituting the processing unit 302.

Encoding the program modules 314 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 314 may transform the physical state of the semiconductor memory, when the software is encoded therein. For example, the program modules 314 may transform the state of transistors, capacitors, or other discrete circuit elements constituting the semiconductor memory.

As another example, the computer-storage media may be implemented using magnetic or optical technology. In such implementations, the program modules 314 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for providing a persona-based application experience are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method executed on a client device, the method comprising computer-implemented operations for configuring an execution of a virtualized software application in a virtual environment of the client device, the method including:
    displaying a user interface of the client device;
    identifying a user of the client device;
    receiving a request, from the user interacting with a user interface of the client device, to execute the virtualized software application, wherein the request includes data indicating a content of a user-selected document;
    selecting a persona from a plurality of personas of the user based in part on the identity of the user of the client device and the content of the user-selected document;
    determining a location of the persona package corresponding to the selected persona, wherein the location is determined based on the selected persona, and wherein the location is located external to the virtual environment;
    selecting, by the virtual environment, a persona package associated with the selected persona at the determined location, wherein the persona package comprises a user interface customization of the virtualized software application;
    customizing the virtualized software application executing within the virtual environment according to the selected persona package; and
    executing the customized virtualized software application within the virtual environment.

2. The computer-implemented method of claim 1, wherein the selected persona package is selected based, at least in part, on a time of day when the virtualized software application is executed.

3. The computer-implemented method of claim 1, wherein the selected persona package is selected based, at least in part, on a current location of the user.

4. The computer-implemented method of claim 1, wherein the selected persona package is selected based, at least in part, on a user preference or configuration.

5. The computer implemented method of claim 1, wherein the selected persona package is selected based, at least in part, on a user generated gesture.

6. The computer-implemented method of claim 1, further comprising providing a configuration manager for generating a plurality of persona configurations, wherein the user is restricted from accessing the configuration manager.

7. The computer-implemented method of claim 1, wherein the selected persona package further comprises storage settings of the virtualized software application.

8. The computer-implemented method of claim 7, wherein the storage settings define a location from which virtualized software application data can be retrieved or to which the virtualized software application data can be stored.

9. The computer-implemented method of claim 1, wherein the selected persona package further comprises state settings of the virtualized software application.

10. The computer-implemented method of claim 9, wherein the state settings define a recent state of the virtualized software application before the virtualized software application was closed.

11. The computer-implemented method of claim 1, further comprising restricting access to the selected persona package to a select administrator to prevent modification of the selected persona package by the user.

12. The computer-implemented method of claim 1, wherein selecting the persona package further comprises selecting the persona package based, at least in part, on established credentials of the user.

13. The computer implemented method of claim 1, wherein selecting the persona package further comprises selecting the persona package based, at least in part, On a computer network of the client device.

14. The computer-implemented method of claim 13, wherein the computer network is based, at least in part, on an IP address of the client device.

15. The computer-implemented method of claim 1, wherein the persona package is selected based in part on a type of the document.

16. A computer system, comprising:
    a processor; and a memory communicatively coupled to the processor, the memory having computer-executable instructions stored thereon which, when executed by the processor, cause the processor to:
  identify a user of the computer system;
  receive a request, from the user interacting with a user interface of the computer system, to execute a virtualized software application, wherein the request includes data indicating a content of a user-selected document;
  transmit the request, wherein a current persona of the user is selected from a plurality of personas of the user and is based on the content of the user selected document and the identity of the user, the current persona comprising data defining one or more user settings;
  determine a location of a persona package corresponding to the current persona, wherein the location is determined based on the selected current persona, and wherein the location is located external to a virtualization layer of the computer system;
  select, by the virtualization layer and from the location, a persona package corresponding to the selected current persona, the selected person package comprising a user setting of the virtualized software application, the user setting including a customization of a user interface of the virtualized software application;
  customize the virtualized software application according to the selected persona package within the virtualization layer; and
  execute the customized virtualized software application within the virtualization layer.

17. The computer system of claim 16, wherein selecting a persona package further comprises selecting the persona package based, at least in part, on a time of day when the virtualized software application is executed.

18. The computer system of claim 16, wherein selecting a persona package further comprises selecting the persona package based, at least in part, on a current location of the user.

19. The computer system of claim 16, wherein selecting a persona package further comprises selecting the persona package based, at least in part, on a computer network of the computer system.

20. The computer system of claim 16, wherein selecting a persona package further comprises selecting the persona package based, at least in part, on a user preference or configuration.

21. The computer system of claim 16, wherein selecting a persona package further comprises selecting the persona package based, at least in part, on user gestures.

22. The computer system of claim 16, wherein selecting a persona package further comprises:
  identifying a persona configuration from a plurality of persona configurations that matches the current persona of the user; and
  retrieving the persona package corresponding to the current persona of the user from the identified persona configuration.

23. The computer system of claim 22, further comprising a configuration manager for generating the plurality of persona configurations, wherein the user is restricted from accessing the configuration manager.

24. The computer system of claim 16, wherein the persona package further comprises storage settings of the virtualized software application.

25. The computer system of claim 24, wherein the storage settings of the virtualized software application define a location from which virtualized software application data can be retrieved or to which the virtualized software application data can be stored.

26. The computer system of claim 16, wherein the persona package further comprises state settings of the virtualized software application.

27. The computer system of claim 26, wherein the state settings define a recent state of the virtualized software application before the virtualized software application was closed.

28. The computer system of claim 16, further comprising restricting access to the persona package to a select administrator to prevent modification of the persona package by the user.

29. A non-transitory computer storage medium comprising computer-executable instructions stored thereon, which when executed by a computer, cause the computer to perform the operations of:
  generating a query for a persona package, wherein the query includes an identity of a virtualized software application and an identity of a user logged into the computer;
  transmitting the query, causing, a current persona of a plurality of personas of the user to be determined based on the identity of the user:
  receiving a query result including the location of a persona package, wherein the location is determined based on the determined current persona, and wherein the location is located external to a virtualization layer of the computer;
  selecting, by the virtualization layer, a persona package at the location corresponding to the determined current persona comprising a user-specified user setting of the virtualized software application;
  customizing the virtualized software application according to the selected persona package within the virtualization layer; and
  executing the customized virtualized software application within the virtualization layer.

30. The non-transitory computer storage medium of claim 29, wherein selecting the persona package further comprises selecting the persona package based, at least in part, on a time of day when the virtualized software application is executed.

31. The non-transitory computer storage medium of claim 29, wherein selecting the persona package further comprises selecting the persona package based, at least in part, on a current location of the user.

32. The non-transitory computer storage medium of claim 29, wherein selecting the persona package further comprises selecting the persona package based, at least in part, on a computer network of the computer that transmitted the query.

33. The non-transitory computer storage medium of claim 29, wherein selecting the persona package further comprises selecting the persona package based, at least in part, on a user preference or configuration.

34. The non-transitory computer storage medium of claim 29, wherein selecting the persona package further comprises selecting the persona package based, at least in part, on gestures generated by the user.

35. The non-transitory computer storage medium of claim 29, wherein selecting a persona package further comprises:

identifying a persona configuration from a plurality of persona configurations that matches the current persona of the user; and retrieving the persona package corresponding to the current persona of the user from the identified persona configuration.

36. The non-transitory computer storage medium of claim 35, which when executed by the computers, further cause the computer to perform the operation of:

providing a configuration manager for generating the plurality of persona configurations, wherein the user is restricted from accessing the configuration manager.

37. The non-transitory computer storage medium of claim 29, wherein the persona package further comprises state settings of the virtualized software application.

38. The non-transitory storage medium of claim 37, wherein the state settings define a recent state of the virtualized software application before the virtualized software application was closed.

39. The non-transitory computer storage medium of claim 29, further comprising restricting access to the persona package to a select administrator to prevent modification of the persona package by the user.

40. A computer system, comprising:
a processor; and
a memory communicatively coupled to the processor, the memory having computer-executable instructions stored thereon which, when executed by the processor, cause the processor to:
transmit, from the computer system, a query for a persona package, wherein the query includes an identity of a virtualized software application, a content of a document selected by a user of the computer system to be loaded by the virtualized software application when executed, and an identity of the user of the computer system;
receive a determined current persona from a plurality of personas of the user of the computer system based on the identity of the user and the content of the document;
receive a location of a persona package corresponding to the determined current persona, wherein the location is located external to a virtualization layer of the computer system;
select, by the virtualization layer, a persona package at the location corresponding to the determined persona, the selected persona package comprising a user-supplied user setting of the virtualized software application;
customize the virtualized software application according to the selected persona package within the virtualization layer; and
execute the customized virtualized software application within the virtualization layer.

41. The computer system of claim 40, wherein select the persona package further comprises select the persona package based, at least in part, on established credentials of the user.

42. The computer system of claim 40, wherein select the persona package further comprises select the persona package based, at least in part, on a computer network of the computer system.

43. The computer system of claim 42, wherein the computer network is based, at least in part, on an IP address of the computer system.

44. The computer system of claim 40, wherein select the persona package further comprises select the persona package based, at least in part, on a user preference or configuration.

45. The computer system of claim 40, wherein the persona package is selected based on the determined current persona of the user, the time of day, and the location of the user.

46. A computer-implemented method for providing a persona-based application experience for a virtualized software application executing within a virtualization layer of a client computer, the method comprising computer-implemented operations for:

identifying a user logged into the client computer;
receiving a request, from the user interacting with a user interface of the client computer, to execute the virtualized software application;
determining a location of a persona package, wherein the persona package comprises a user-specified user setting of the virtualized software application, wherein determining the location of the persona package is based on determining a current persona of the user logged into the client computer, and wherein the current persona of the user is one of a plurality of personas of the user;
selecting, by the virtualization layer, the persona package at the determined location, wherein the determined location is located external to the virtualization layer;
customizing, within the virtualization layer, the virtualized software application according to the selected persona package; and
executing, within the virtualization layer, the customized virtualized software application.

47. The computer-implemented method of claim 46, wherein the persona package further comprises a user setting including a state of the virtualized software application.

48. The computer-implemented method of claim 47, wherein the state of the virtualized software application includes a list of documents recently accessed by the virtualized software application.

49. The computer-implemented method of claim 47, wherein the state of the virtualized software application includes a list of recent symbols inserted into one or more documents.

* * * * *